(12) United States Patent
Takaoki

(10) Patent No.: US 10,585,415 B2
(45) Date of Patent: Mar. 10, 2020

(54) PORTABLE OPERATION PANEL HAVING VIBRATING FUNCTION AND VIBRATION-DETECTING FUNCTION

(71) Applicant: FANUC CORPORATION, Yamanashi (JP)

(72) Inventor: Hidesato Takaoki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 170 days.

(21) Appl. No.: 15/822,770

(22) Filed: Nov. 27, 2017

(65) Prior Publication Data

US 2018/0150053 A1 May 31, 2018

(30) Foreign Application Priority Data

Nov. 28, 2016 (JP) ................................. 2016-230243

(51) Int. Cl.
*G01N 29/12* (2006.01)
*G05B 19/4062* (2006.01)

(52) U.S. Cl.
CPC ..... *G05B 19/4062* (2013.01); *G05B 2219/37432* (2013.01); *G05B 2219/37435* (2013.01)

(58) Field of Classification Search
CPC ...... G05B 19/4062; G05B 2219/37435; G05B 2219/37432
USPC ........................................................ 73/579
See application file for complete search history.

(56) References Cited

U.S. PATENT DOCUMENTS

| 6,917,837 | B2 | 7/2005 | Hashimoto et al. | |
| 7,640,139 | B2* | 12/2009 | Sahara | G01H 1/003 702/182 |
| 7,860,663 | B2* | 12/2010 | Miyasaka | G01H 1/003 702/35 |
| 10,081,109 | B2 | 9/2018 | Kowalski et al. | |
| 2006/0236771 | A1* | 10/2006 | Lin | G01H 1/00 73/649 |
| 2007/0068756 | A1* | 3/2007 | Huston | F16F 7/1005 188/378 |

(Continued)

FOREIGN PATENT DOCUMENTS

| CN | 102135444 | * | 7/2011 |
| CN | 103344704 A | | 10/2013 |

(Continued)

*Primary Examiner* — Jacques M Saint Surin
(74) *Attorney, Agent, or Firm* — RatnerPrestia

(57) ABSTRACT

A portable operation panel having a vibration motor configured to tactually provide information to an operator, and having a configuration capable of rapidly and accurately detecting a structural damage or deterioration of the vibration motor. The operation panel has a controlling section configured to control the behavior of the operation panel; a vibration generating unit capable of vibrating at a natural frequency of the operation panel; a vibration detecting unit configured to detect the vibration and/or acceleration of the operation panel; and an inputting section to which the operator can input information. The controlling section judges that the operation panel has an abnormality, when a vibrational amplitude of the operation panel detected by the vibration detecting unit, during the vibration generating unit vibrates at the natural frequency, falls below a predetermined threshold.

6 Claims, 3 Drawing Sheets

(56) References Cited

U.S. PATENT DOCUMENTS

| | | | | |
|---|---|---|---|---|
| 2010/0102976 A1* | 4/2010 | Lee | ............... | G01H 1/003 340/646 |
| 2011/0016973 A1* | 1/2011 | Hamatani | ............. | G01P 15/125 73/514.29 |
| 2015/0005942 A1* | 1/2015 | Inaba | .................... | B25J 13/025 700/264 |
| 2015/0268092 A1 | 9/2015 | Sone | | |
| 2015/0355216 A1* | 12/2015 | Girardeau | .............. | G01H 11/08 73/514.29 |
| 2015/0367963 A1* | 12/2015 | Swearingen | .......... | G01M 17/04 701/31.4 |

FOREIGN PATENT DOCUMENTS

| | | |
|---|---|---|
| CN | 104931128 A | 9/2015 |
| JP | S61252693 A | 11/1986 |
| JP | 2003288105 A | 10/2003 |
| JP | 2005-241331 A | 9/2005 |
| JP | 2012-234253 A | 11/2012 |
| JP | 2014038540 A | 2/2014 |
| JP | 2014050950 A | 3/2014 |
| JP | 2015-027723 A | 2/2015 |
| KR | 20130009316 A | 1/2013 |

* cited by examiner

PORTABLE OPERATION PANEL HAVING VIBRATING FUNCTION AND VIBRATION-DETECTING FUNCTION

CROSS-REFERENCE TO RELATED APPLICATIONS

This application is a new U.S. Patent Application that claims benefit of Japanese Patent Application No. 2016-230243, filed Nov. 28, 2016, the disclosure of this application being incorporated herein by reference in its entirety for all purposes.

BACKGROUND OF THE INVENTION

1. Field of the Invention

The present invention relates to a portable operation panel which is used in association with a controller of a machine such as a robot.

2. Description of the Related Art

When a machine such as a robot is taught or operated, a portable operation panel may be used in association with a robot controller of the robot. In this case, an operator may perform an operation without monitoring an indicator such as a display of the operation panel (e.g., the operator may operate the operation panel while looking at the robot). Further, the operation panel may be used in a loud environment, and in such a case, it may be difficult to inform the operator of information from the operation panel in an auditory way.

In view of the above, in some conventional techniques, the portable operation panel is provided with a vibration motor so that the operator can be haptically informed of information by vibration of the operation panel. For example, JP 2015-027723 A discloses a portable operation panel having a plurality of vibration motors and a means to switch the vibration motor to be used.

On the other hand, the portable operation panel may be damaged from an impact, etc., due to carelessness of the operator. In such a case, a technique for judging a failure of the operation panel by using an acceleration sensor is well known. For example, JP 2005-241331 A discloses a negligence degree judging system, in which, when a degree of impact detected by an acceleration sensor of a portable information terminal exceeds a predetermined value, the maximum degree of impact within a certain period after the detection and a generation time of the maximum degree of impact are stored in a non-volatile memory. Further, in the system, data of the maximum degree of impact stored in the non-volatile memory is obtained, and a degree of effect due to a fault by a user is judged based on a cause-effect relationship between the data and the failures of the portable information terminal.

Further, JP 2012-234253 A discloses a portable terminal having an acceleration sensor, an impact database for storing an impact pattern corresponding to a time change of acceleration at the time of reception of an impact or oscillation, and a display for displaying an alarm relating to handling of the portable terminal when the time change of acceleration detected by the acceleration sensor matches the impact pattern.

The portable operation panel (in particular, a housing thereof), such as a teach pendant for teaching a robot, etc., may be damaged by impact, etc., due to carelessness of the operator. When the operation panel having the broken housing is continued to be used, the operator should be promptly informed so that the operator can take appropriate measures such as repair or exchange, since deterioration of inner parts or electrical shock may be increased due to entering of cutting liquid, etc., in the housing. However, although the degree of impact applied to the portable operation panel can be measured by merely using the acceleration sensor, it may be difficult to correctly judge as to whether the operation panel is actually damaged so that the operation panel must be repaired or exchanged.

Further, in the portable operation panel using the vibration motor, the operation panel may be inoperable due to the deterioration of the vibration motor. Structurally, a mechanical life of a vibration motor used in the portable operation panel is usually shorter than the life of another device used in an industrial robot or other machine, and thus a portable operation panel having a means that precisely detects the deterioration of the vibration motor is desired.

SUMMARY OF THE INVENTION

Thus, the object of the present invention is to provide a portable operation panel having a vibration motor configured to tactually provide information to an operator, and having a configuration capable of rapidly and accurately detecting a structural damage or deterioration of the vibration motor.

The present invention provides a portable operation panel, configured to communicate with a controller for controlling a machine, and used to operate the machine, the portable operation panel comprising: a vibration generating unit, configured to generate vibration for providing predetermined information to an operator, and capable of vibrating at a natural frequency of the portable operation panel; a vibration detecting unit configured to detect the vibration of the portable operation panel; and a controlling section configured to judge that the portable operation panel has an abnormality, when a vibrational amplitude of the portable operation panel detected by the vibration detecting unit, during the vibration generating unit vibrates at the natural frequency, falls below a predetermined threshold.

In a preferred embodiment, the vibration detecting unit is an acceleration sensor or a vibration sensor, and wherein the controlling section judges that a structure of the portable operation panel has been damaged, when the vibrational amplitude of the portable operation panel during the vibration generating unit vibrates at the natural frequency falls below the predetermined threshold, after the acceleration sensor or the vibration sensor detects an acceleration equal to or larger than a preset value at which the portable operation panel is considered to be dropped or impacted.

In this case, the vibration generating unit may be configured to arbitrarily change a frequency thereof within a predetermined range including the natural frequency of the portable operation panel, and the controlling section may be configured to, after judging that the structure of the portable operation panel has been damaged, control the vibration generating unit and the acceleration sensor so that the vibrational amplitude of the portable operation panel is measured while the frequency of the vibration generating unit is varied.

In a preferred embodiment, the controlling section is configured to vibrate the vibration generating unit at the natural frequency of the portable operation panel at the time when power is applied to the portable operation panel, and is configured to judge that a structure of the portable operation panel has been damaged, when the vibrational amplitude of the portable operation panel during the vibration generating unit vibrates at the natural frequency falls below the predetermined threshold.

In a preferred embodiment, the portable operation panel has a battery or a power generating unit configured to generate power by using vibration energy due to the impact applied to the portable operation panel, wherein the vibration detecting unit is an acceleration sensor is configured to utilize power from the battery or the power generating unit so as to detect an acceleration equal to or larger than a preset value at which the portable operation panel is considered to be dropped or impacted, when a power source of the portable operation panel is shut-off.

The portable operation panel may have a mechanism configured to previously and purposely vary at least one of a weight or rigidity of the portable operation panel, corresponding to a position of damaged portion of the portable operation panel.

In a preferred embodiment, the controlling section is configured to vibrate the vibration generating unit at the natural frequency of the portable operation panel, at predetermined periodic time intervals or based on an input by an operator, and is configured to judge that the vibration generating unit is deteriorated when the vibrational amplitude of the portable operation panel during the vibration generating unit vibrates at the natural frequency is gradually decreased and falls below the predetermined threshold.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTION

Figure 1:
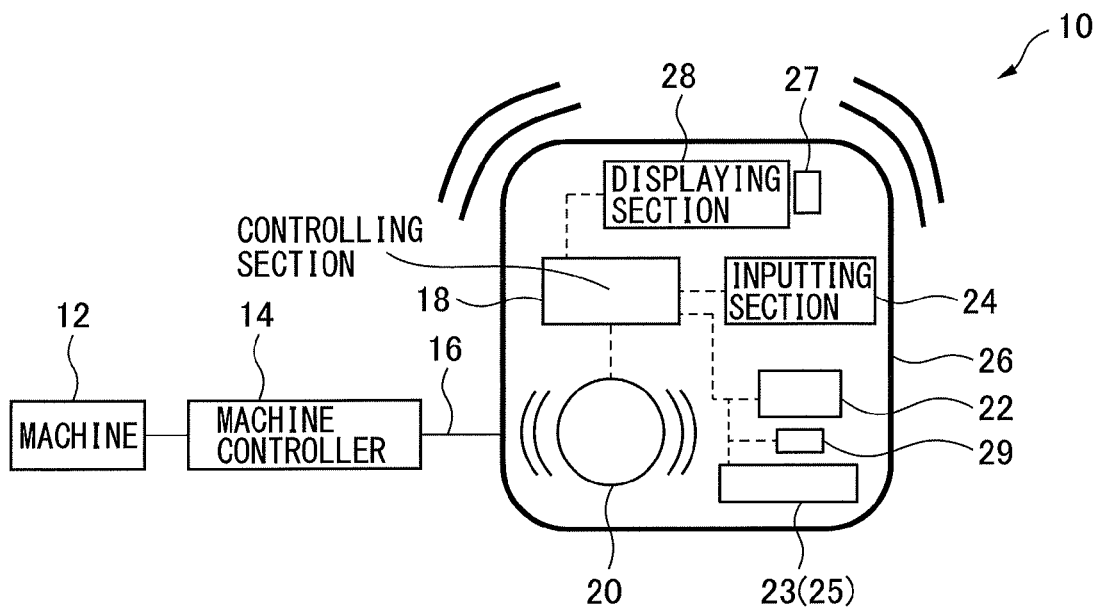
FIG. 1 is a view showing a schematic configuration of a portable operation panel according to a preferred embodiment of the present invention.

FIG. 1 is a view showing a schematic configuration of a portable operation panel 10 according to a preferred embodiment of the present invention. Portable operation panel (hereinafter, also referred to as merely "operation panel") 10 is used to operate a schematically shown machine 12 such as a robot, a machine tool or an industrial machine. Typically, portable operation panel 10 is a teach pendant used by an operator so as to teach a robot (in particular, a multi-joint robot). Operation panel 10 is communicably connected to a schematically shown machine controller 14 configured to control machine 12 such as the robot, via radio waves or a wire such as an electric cable 16. An operator may convey operation panel 10 within a predetermined area from machine controller 14, and may operate or teach machine 12 by using operation panel 10.

Operation panel 10 has a controlling section 18 such as a CPU configured to control the behavior of operation panel 10; at least one (one in the illustrated embodiment) vibration generating unit (e.g., a vibration motor) 20; a vibration detecting unit 22 such as a three-axis vibration sensor configured to detect the vibration and/or acceleration of operation panel 10; and an inputting section 24, such as a keyboard or touch panel, to which the operator can input information. Controlling section 18 may control the behavior of operation panel 10 based on the information which is input into inputting part 24. In addition, operation panel 10 may have a displaying section 28 such as an LCD, configured to display an alarm (as explained below) and/or information regarding the damage of operation panel 10 (in particular, a housing 26 thereof) and the deterioration of vibration motor 20, etc.

Vibration motor 20 is operated based on a command from controlling section 18, and then at least a part of operation panel 10 is vibrated due to the motion of vibration motor, whereby the operator can haptically sense the vibration. Controlling section 18 can change a vibration condition (e.g., the frequency and intensity of the vibration, whether the vibration is continuous or intermittent, and a vibration period when the vibration is intermittent) of vibration motor 20. By previously associating the vibration condition with a content of information such as an alarm (e.g., an abnormality of the robot or access of the human to an off-limits area) to be noticed by the operator, the operator can tactually recognize various information by the vibration. As explained below, controlling section 18 has functions to operate vibration motor 20 and acceleration sensor 22, judge that operation panel 10 is damaged or broken based on a result of the operation, and display a result of the judgment on displaying part 28. In addition, at least a part of the functions of controlling section 18 may be provided to a device (e.g., machine controller 14) other than operation panel 10.

Working Example 1

Figure 2:
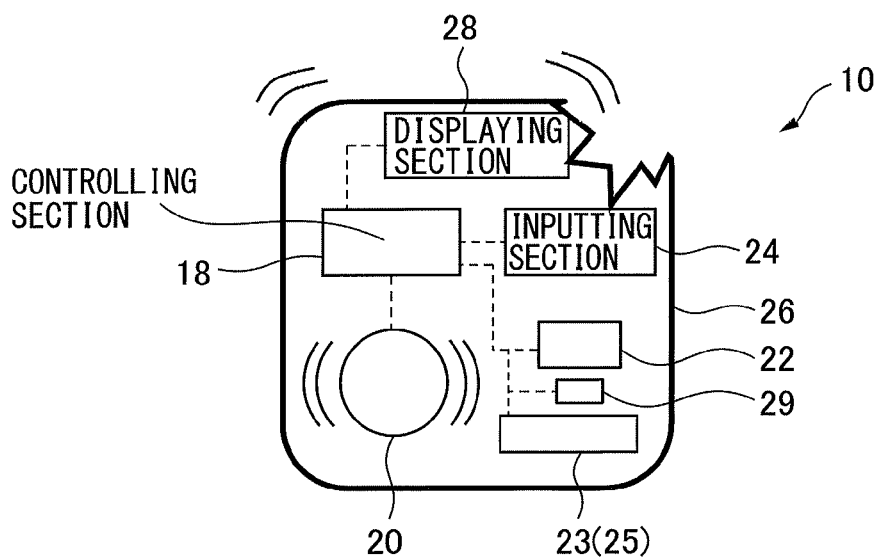
FIG. 2 is a view showing a state in which the portable operation panel of FIG. 1 is damaged.

In this example, as shown in FIG. 2, it is assumed that housing 26 of operation panel 10 is broken by falling or impact, etc., due to carelessness of the operator. In general, a sympathetic vibration is generated when a physical object vibrates at a natural frequency of the object, and thus it is preferable that vibration motor be configured to vibrate at a frequency other than the natural frequency thereof. In this regard, vibration generating unit 22 may be an acceleration sensor or vibration sensor, configured to detect a large acceleration of operation panel 10 (i.e., an acceleration or vibration which does not occur under normal use) caused by falling or impact. Then, when acceleration sensor 22 detects an acceleration equal to or larger than a preset value at which operation panel 10 is considered to be dropped or impacted, controlling section 18 switches the vibrational frequency of vibration motor 20 so that vibration motor 20 is vibrated at the natural frequency of operation panel 10 in a normal state (in which the operation panel is not damaged or broken).

Vibration motor 20 may be vibrated at the natural frequency of operation panel 10 even in normal use thereof, and in such a case, it is not necessary to switch the frequency of vibration motor 20. In this case, however, it is preferable that an output of vibration motor 20 in normal use be lowered so as to reduce the vibrational amplitude of the motor, in order to prevent operation panel 10 from being damaged by the sympathetic vibration. This is also applicable to a second working example described below.

Acceleration sensor 22 detects the vibrational amplitude of operation panel 10 at the natural frequency thereof. In this regard, as indicated by a graph 30 of FIG. 3, when operation panel 10 after being impacted is not substantially damaged or broken, the vibrational amplitude is maximal at the natural frequency (in this case, 100 Hz) due to the sympathetic vibration (or resonance). On the other hand, when a part of housing 26 is broken (i.e., the weight of operation panel 10 is decreased) or when the rigidity of housing 26 is lowered (e.g., a connecting member such as a screw of a structure such as a frame of housing 26 is loosened), the natural frequency of operation panel 10 is changed from in the normal state, as indicated by a solid line graph 32 (in the drawing, the natural frequency falls below 100 Hz in the normal state). Therefore, the vibrational amplitude at the original natural frequency (100 Hz) becomes significantly lower than the normal state.

Figure 3:
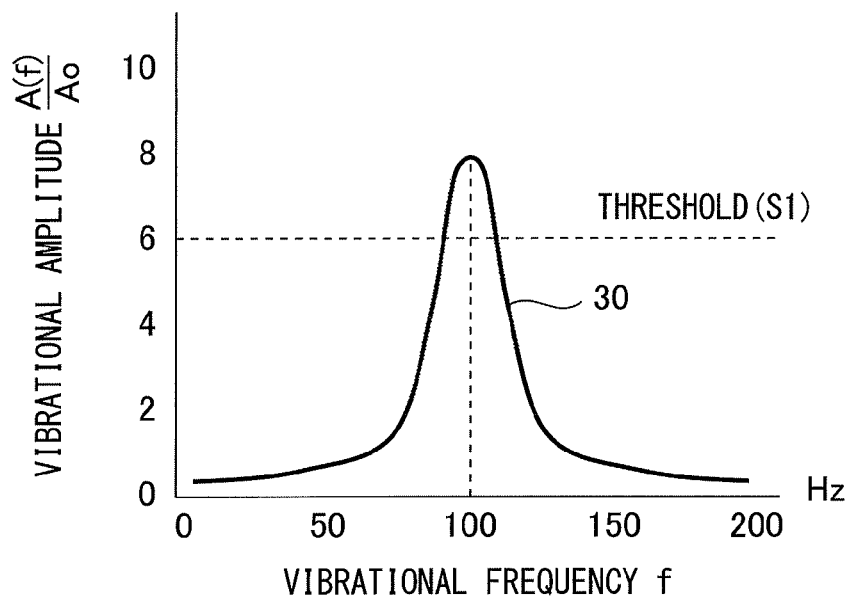
FIG. 3 is a graph representing a relationship between a vibrational frequency and vibrational amplitude in a normal portable operation panel.
Figure 4:
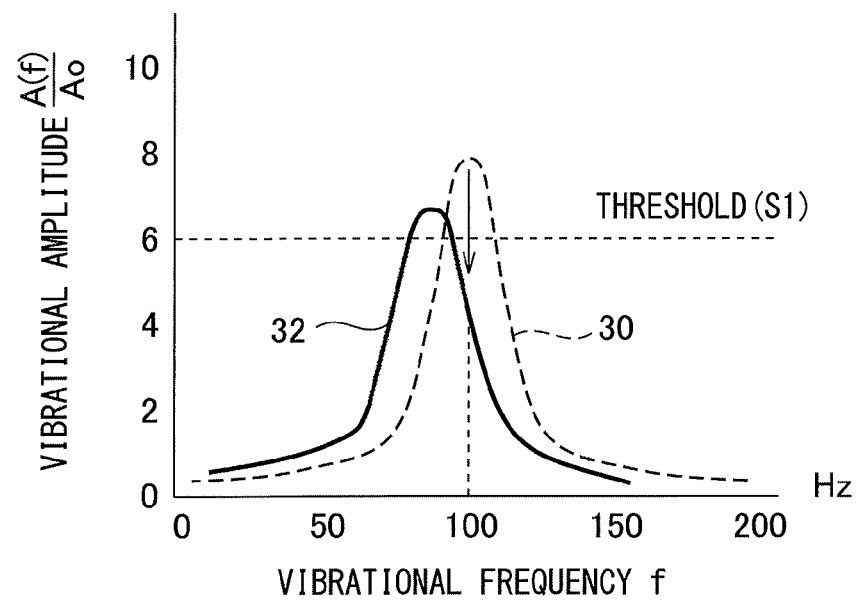
FIG. 4 is a graph representing a relationship between a vibrational frequency and vibrational amplitude in a damaged portable operation panel.

In view of the above, as shown in FIG. 3 or 4, a threshold S1 is previously set as a value (in the drawing, a dimensionless number "8") representing the amplitude at the natural frequency (in this case, 100 Hz) in the normal state. Alternatively, threshold S1 may be set as a value (in the drawing, a dimensionless number "6") obtained by subtracting a predetermined margin from the value (in this case, dimensionless number "8") representing the amplitude at the natural frequency in the normal state. Then, when the amplitude at the original natural frequency is lower than threshold S1 as shown in FIG. 4, it can be judged that the structure (e.g., the housing) of operation panel 10 has an abnormality such as breakage. Further, the judgment result can be displayed on displaying section 28 and/or can be output as an audible alarm. Accordingly, the operator can discontinue use of operation panel 10, and can take appropriate measures such as repair or exchange of housing 26, etc.

In the first working example, vibration motor 20 has a function to, in the normal state, haptically provide information to the operator by the vibration at the frequency other than the natural frequency, and also has a function to, when operation panel 10 may have been damaged or broken, vibrate the operation panel at the natural frequency thereof in order to judge as to whether operation panel 10 is actually damaged or broken. On the other hand, acceleration sensor 22 has a function to detect a relatively large acceleration due to falling or impact, and a function to measure the vibrational amplitude when vibration motor 20 vibrates at the natural frequency. In the first working example, each of vibration motor 20 and acceleration sensor 22 has plural functions, and thus it can be correctly judged as to whether or not operation panel 10 is damaged due to falling or impact, by organically associating the above functions with each other.

In the first working example, it is assumed that operation panel 10 is dropped or impacted during use. In this regard, even when a power of operation panel 10 is shut-off (or in an OFF state), operation panel 10 may be damaged or impacted. In such a case, vibration motor 20 may be vibrated at the natural frequency without any condition when or immediately after the operation panel is powered on, and then the amplitude at that time point may be measured and compared to the threshold. By virtue of this, it can be judged as to whether the operation panel has been damaged or broken.

Alternatively, a battery 23 may be previously incorporated in operation panel 10, so that acceleration sensor 22 is in an operating condition even when the power of operation panel 10 is shut-off. Then, when a certain degree of or higher impact is applied to operation panel 10 in the OFF state, acceleration sensor 22 can measure and store the magnitude of the acceleration and a time point of the measurement in a memory 29, etc., by utilizing the power from battery 23. On the other hand, controlling section 18 may control vibration motor 20 so as to automatically vibrate at the natural frequency, in case that memory 29 stores information that the impact was detected when operation panel 10 is powered on. Alternatively, when operation panel 10 does not contain the battery, operation panel may be provided with a power generating unit 25 configured to generate power by using vibration energy due to the certain magnitude or more impact applied to operation panel 10. By virtue of this, information that the impact is applied to the operation panel can be stored in the memory by using the power generated by power generating unit 25.

It is referable that vibration motor 20 be configured to arbitrarily change the vibrational frequency thereof within a predetermined range including the natural frequency of operation panel 10. After judging that operation panel 10 is damaged by falling or impact, controlling section 18 controls vibration motor 20 and acceleration sensor 22 so that acceleration sensor 22 measures the vibrational amplitude of the operation panel during the frequency of vibration motor 20 is changed, whereby a changed natural frequency of operation panel 10 due to the damage can be measured or detected. By using the changed natural frequency and a previously (e.g., experimentally) determined relationship between the natural frequency and the position of the damaged portion of the operation panel, it can be identified where in operation panel 10 has been damaged or broken. Concretely, operation panel 10 may be provided with memory 29, etc., which previously stores data regarding the relationship between the position of the damaged portion and the natural frequency, and the actually changed natural frequency of operation panel 10 may be compared to the stored data. By virtue of this, it can be identified which portion of operation panel 10 has been damaged or broken, and the identified damaged portion can be displayed on displaying section 28, etc.

In general, a physical object after being impacted vibrates at a natural frequency thereof. Therefore, acceleration sensor 22 may be configured to measure the vibrational frequency of operation panel 10 immediately after detecting the acceleration due to falling or impact. By virtue of this, even when vibration motor 20 does not purposely vibrate at the natural frequency, is can be judged as to whether operation panel 10 has been damaged or broken.

The degree of damage or breakage of operation panel 10 due to falling or impact may be widely changed. For example, the operation panel may have a damage which is easily observed by the operator. On the other hand, even when the operation panel has a relatively slight damage which is difficult to be observed, it may be inappropriate to continue to use the operation panel having such damage since liquid, etc., may enter the operation panel from the damaged portion. In particular, in the latter case, the vibrational amplitude at the natural frequency may not fall below the threshold, resulting in that the damage cannot be detected. Therefore, operation panel 10 may be provided with a mechanism configured to previously and purposely vary at least one of the weight or rigidity of operation panel 10, corresponding to the position of the damaged portion thereof, when the operation panel is relatively slightly damaged but it is inappropriate to continue to use the operation panel due to the damage. For example, when a glass of an LCD constituting displaying section 28 is broken, the structure may loosen the connection between the members constituting operation panel 10 so as to lower the rigidity of the entire (in particular, near the acceleration sensor) of operation panel 10, or may remove a weight 27 previously provided to operation panel 10 so as to reduce the total weight of operation panel 10.

Working Example 2

In this example, it is assumed that vibration generating unit (vibration motor) 20 is deteriorated over time, and thus it is inappropriate to use the operation panel having the deteriorated motor. Controlling section 18 controls vibration motor 20 so as to vibrate at the natural frequency (in this case, 100 Hz) of operation panel 10 in the normal state (in particular, controlling section 18 switches the frequency of vibration motor 20 from the frequency (other than 100 Hz) in the usual operation to the natural frequency of operation panel 10), periodically at predetermined time intervals, or based on an input command by the operator. Then, similarly to the first working example, vibration detecting unit (acceleration sensor) 22 measures the vibrational frequency of the operation panel when vibration motor 20 vibrates at the natural frequency, and the measurement result is stored in memory 29, etc., as time series data.

Figure 5:
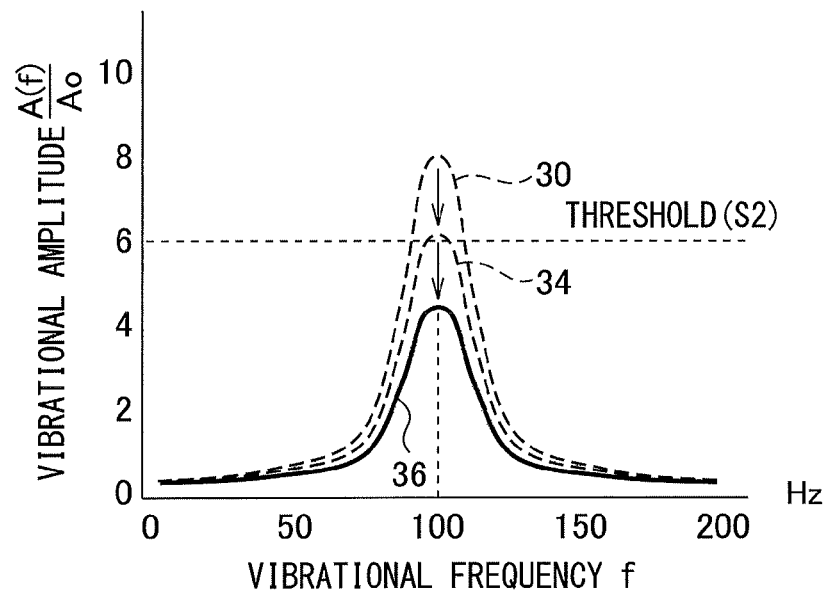
FIG. 5 is a graph representing a relationship between a vibrational frequency and vibrational amplitude in a portable operation panel having a deteriorated vibration motor.

When vibration motor 20 is deteriorated to some extent, the vibrational amplitude at the natural frequency (or the local maximum value) is gradually decreased, as indicated by graphs 34 and 36 in FIG. 5. Therefore, when the amplitude at the natural frequency is gradually decreased (i.e., an amount of decrease in the amplitude between predetermined time intervals is within a certain value) and when the amplitude falls below a previously (experimentally) determined threshold S2 as an index of deterioration of vibration motor 20, it may be judged that vibration motor 20 has been considerably deteriorated, and then the judgment result may be displayed on displaying section 28 and/or may be output as an audible alarm, etc. Then, the operator can discontinue use of operation panel 10, and can take appropriate measures such as repair or exchange of vibration motor 20. In addition threshold S2 may be the same as or different from threshold S1 in the first working example.

Figure 6:
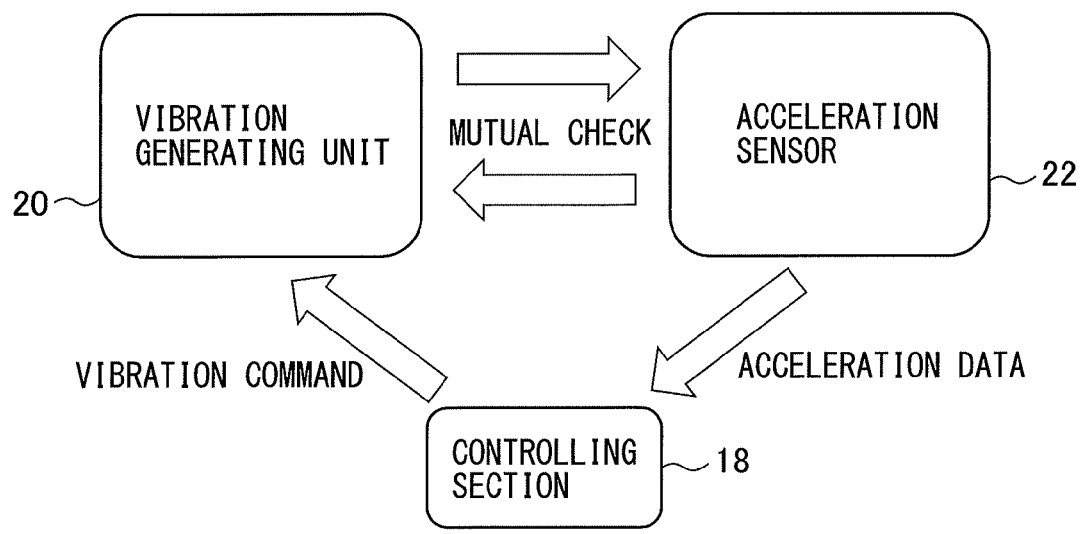
FIG. 6 is a view schematically showing a relationship among a controlling section, a vibration motor and an acceleration sensor of the portable operation panel.

FIG. 6 explains a mutual checking function between vibration motor 20 and acceleration sensor 22 in the first and/or second working example. By (preferably, constantly) monitoring the vibration of vibration motor 20 by using acceleration sensor 22, it can be checked as to whether or not vibration motor 20 is correctly operated. For example, in case that the acceleration of operation panel 10 (due to other than vibration motor 20) is correctly detected by acceleration sensor 22 (i.e., the movement or change in orientation of operation panel 10 is detected as acceleration data, and that effect is recognized by controlling section 18), when acceleration sensor 22 does not the vibration, even though a signal for vibration (or a vibration command) is transmitted to vibration motor 20, it can be judged that an abnormality occurs in vibration motor 20.

To the contrary, by (preferably, constantly) monitoring as to whether the vibration of vibration motor 20 is correctly detected by acceleration sensor 22, it can be checked as to whether or not acceleration sensor 22 is correctly operated. For example, when acceleration sensor 22 does not the vibration, even though a signal for vibration (or a vibration command) is transmitted to vibration motor 20 and it is tactually obvious that vibration motor 20 vibrates, it can be judged that an abnormality occurs in acceleration sensor 22.

In the above embodiment, in the portable operation panel containing the acceleration sensor and the vibration motor capable of vibrating at the natural frequency, trouble such as the breakage of the operation panel or the deterioration of the vibration motor can be detected without using another means. Also, when the breakage occurred can be detected. Therefore, a risk of long-time use of the operation panel can be limited, and maintenance of the operation panel can be rapidly carried out by the automatic communication such as an alarm, whereby an operation efficiency of the machine to be operated by the operation panel can be improved.

According to the present disclosure, by monitoring the vibrational amplitude at the natural frequency of the portable operation panel, the breakage of the operation panel and/or the deterioration of the vibration motor can be rapidly and correctly detected.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A portable operation panel, configured to communicate with a controller for controlling a machine, and used to operate the machine, the portable operation panel comprising:
   a vibration generating unit, configured to generate vibration for providing predetermined information to an operator, and configured to be vibrated at a natural frequency of the portable operation panel;
   a vibration detecting unit configured to detect the vibration of the portable operation panel; and
   a controlling section configured to judge that the portable operation panel has an abnormality, when a vibrational amplitude of the portable operation panel detected by the vibration detecting unit, during the vibration generating unit vibrates at the natural frequency, falls below a predetermined threshold.

2. The portable operation panel as set forth in claim 1, wherein the vibration detecting unit is an acceleration sensor or a vibration sensor, and wherein the controlling section judges that a structure of the portable operation panel has been damaged, when the vibrational amplitude of the portable operation panel during the vibration generating unit vibrates at the natural frequency falls below the predetermined threshold, after the acceleration sensor or the vibration sensor detects an acceleration equal to or larger than a preset value at which the portable operation panel is considered to be dropped or impacted.

3. The portable operation panel as set forth in claim 2, wherein the vibration generating unit is configured to arbitrarily change a frequency thereof within a predetermined range including the natural frequency of the portable operation panel, and the controlling section is configured to, after judging that the structure of the portable operation panel has been damaged, control the vibration generating unit and the acceleration sensor so that the vibrational amplitude of the portable operation panel is measured while the frequency of the vibration generating unit is varied.

4. The portable operation panel as set forth in claim 1, wherein the controlling section is configured to vibrate the vibration generating unit at the natural frequency of the portable operation panel at the time when power is applied to the portable operation panel, and is configured to judge that a structure of the portable operation panel has been damaged, when the vibrational amplitude of the portable operation panel during the vibration generating unit vibrates at the natural frequency falls below the predetermined threshold.

5. The portable operation panel as set forth in claim 1, further comprising a battery or a power generating unit configured to generate power by using vibration energy due to the impact applied to the portable operation panel, wherein the vibration detecting unit is an acceleration sensor is configured to utilize power from the battery or the power generating unit so as to detect an acceleration equal to or larger than a preset value at which the portable operation panel is considered to be dropped or impacted, when a power source of the portable operation panel is shut-off.

6. The portable operation panel as set forth in claim 1, wherein the controlling section is configured to vibrate the vibration generating unit at the natural frequency of the portable operation panel, at predetermined periodic time intervals or based on an input by an operator, and is configured to judge that the vibration generating unit is deteriorated when the vibrational amplitude of the portable operation panel during the vibration generating unit vibrates at the natural frequency is gradually decreased and falls below the predetermined threshold.

* * * * *